(12) United States Patent
Oppelt

(10) Patent No.: US 6,273,309 B1
(45) Date of Patent: Aug. 14, 2001

(54) FISHERMAN'S TRASH RECEPTACLE AND FLY RIG HOLDER

(76) Inventor: John R. Oppelt, P.O. Box 123, Livingston, MT (US) 59047

(*) Notice: Subject to any disclaimer, the term of this patent is extended or adjusted under 35 U.S.C. 154(b) by 0 days.

(21) Appl. No.: 09/521,615

(22) Filed: Mar. 9, 2000

Related U.S. Application Data

(60) Provisional application No. 60/124,040, filed on Mar. 11, 1999.

(51) Int. Cl.[7] .................................. A45F 5/02; A45F 5/00
(52) U.S. Cl. ...................... 224/269; 224/199; 224/235; 224/920; 43/54.1; 2/94; 220/229
(58) Field of Search ....................... 224/191, 197, 224/199, 603, 604, 605, 660, 665, 666, 678, 679, 235, 236, 237, 247, 248, 269, 919, 920; 43/54.1; 2/94; 190/125; 220/229, 837, 839, 847, 751

(56) References Cited

U.S. PATENT DOCUMENTS

| | | | |
|---|---|---|---|
| 1,806,477 | * | 5/1931 | Lloyd et al. ................. 224/920 X |
| 1,815,101 | * | 7/1931 | Goldstein ..................... 224/920 X |
| 2,455,765 | * | 12/1948 | Harvey ............................ 224/255 |
| 3,086,674 | * | 4/1963 | Scheuerman .................... 220/229 |
| 3,315,402 | * | 4/1967 | Scott et al. ................ 220/229 X |
| 3,832,798 | * | 9/1974 | Pilston ....................... 224/920 X |
| 4,383,385 | * | 5/1983 | Myers ......................... 224/920 X |
| 4,566,616 | * | 1/1986 | Rise ........................... 224/679 X |
| 4,884,717 | * | 12/1989 | Bussard et al. ................. 220/229 |
| 5,228,546 | * | 7/1993 | Chang et al. ................ 190/125 X |
| 5,593,059 | * | 1/1997 | Neilson ........................... 220/229 |
| 5,819,984 | * | 10/1998 | Krueger ..................... 220/751 X |

* cited by examiner

Primary Examiner—Gregory M. Vidovich
(74) Attorney, Agent, or Firm—Richard C. Conover

(57) ABSTRACT

The present invention includes a cylindrical container closed at one end and opened at the other. The container is wrapped with Velcro material, or a foam material, to which leader and fly rigs can be easily wrapped and kept in place. A lid is provided to cover the open top of the container, the lid is hingedly attached to the container to prevent inadvertent loss of the lid. The lid is also provided with cross slits so that small items can be pushed through the slits for storage within the closed container. Further, a clip is fixed to the container so that the receptacle can be easily attached to a fly fisherman's vest.

8 Claims, 2 Drawing Sheets

FISHERMAN'S TRASH RECEPTACLE AND FLY RIG HOLDER

This application claims benefit of 60/124,040 filed Mar. 11, 1999.

BACKGROUND OF THE INVENTION

The present invention relates to a fisherman's trash receptacle for conveniently storing unwanted leader, flies, shot weights and other small objects. In addition, the present invention also provides a convenient storage device for fly fishing rigs. Fly fishermen find it difficult to conveniently store double rigs when wanting to substitute a single dry fly for the double rig, for example. The present invention provides a convenient storage device which can be used for wrapping the double-fly rigs around the receptacle for easy storage.

SUMMARY OF INVENTION

The present invention includes a cylindrical container closed at one end and open at the other. The container is wrapped with Velcro material, or a foam material, to which leader and fly rigs can be easily wrapped and kept in place. A lid is provided to cover the open top of the container. The lid is hingedly attached to the container to prevent inadvertent loss of the lid. The lid is also provided with cross slits so that small items can be pushed through the slits for storage within the closed container. Further, a clip is fixed to the container so that the receptacle can be easily attached to a fly fisherman's vest.

DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

A receptacle 10, according to the present invention, is shown in FIGS. 1–4. In a preferred embodiment, receptacle 10 includes a cylindrical container 12 which is closed at one end, and open at the top. Container 12, in a preferred embodiment, has a cover 14 which is wrapped around container 12 and secured to container 12 as by glueing. In a preferred embodiment, the cover 14 is constructed of Velcro or of a foam material, such as Sheet Foam, sold by Rany's Flies & Supplies, Inc., of Logan, Utah.

Figure 1:
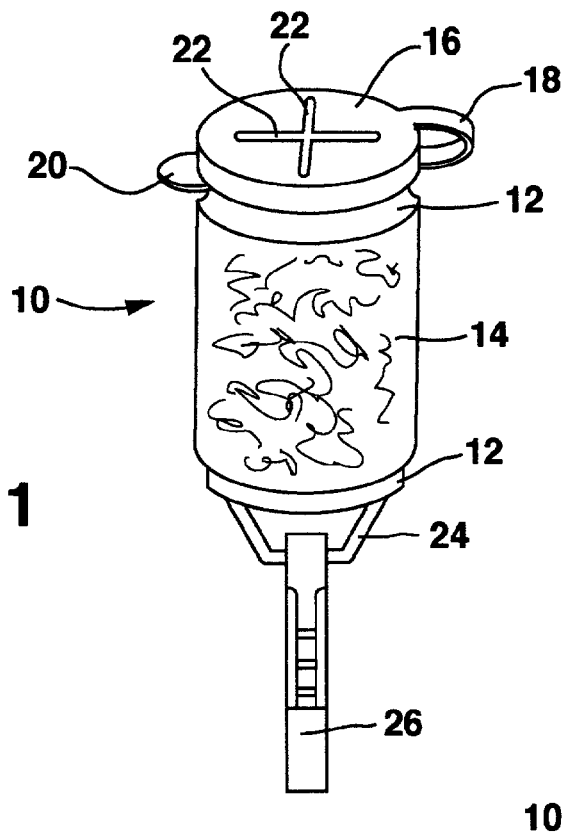
FIG. 1 is a perspective view of the present invention.
Figure 2:
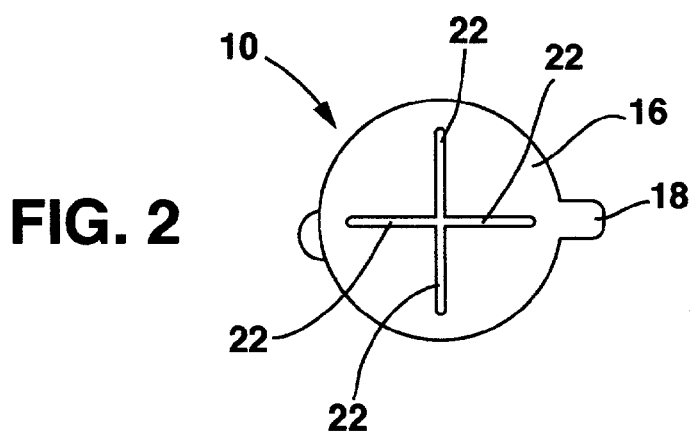
FIG. 2 is a top plan view of the invention shown in FIG. 1.
Figure 3:
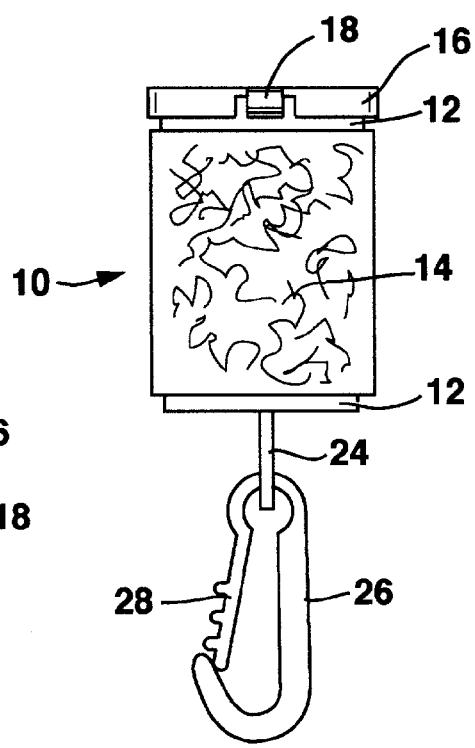
FIG. 3 is a right side elevational view of the invention shown in FIG. 1.
Figure 4:
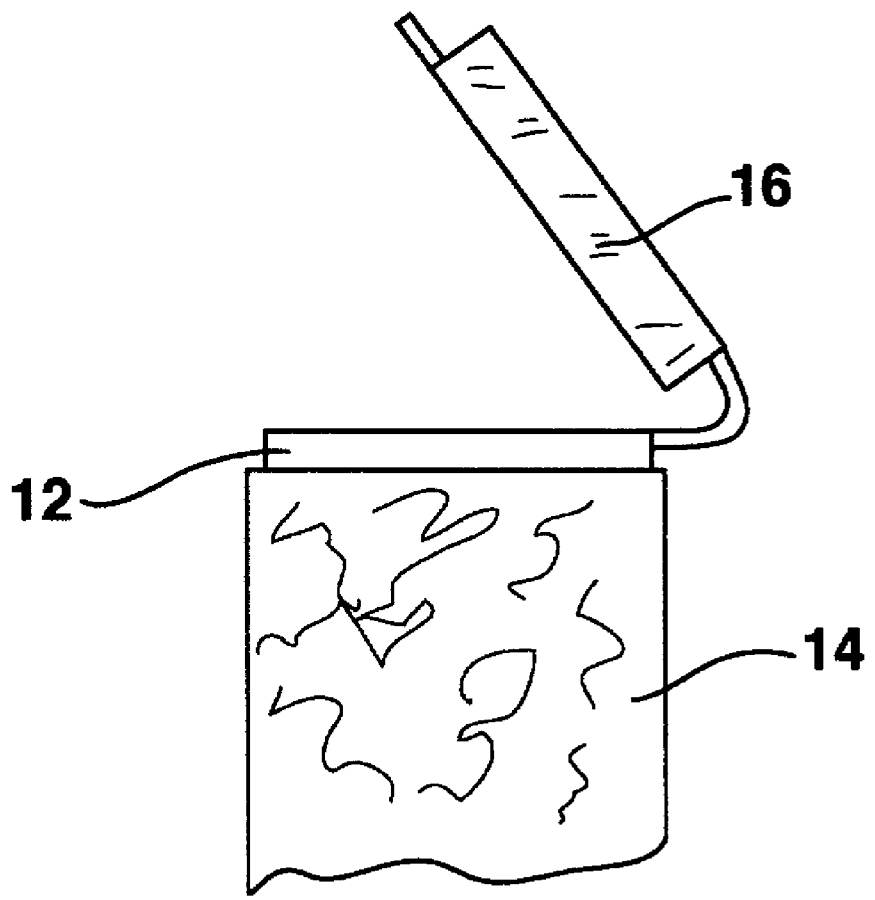
FIG. 4 is a partial front elevational view of the invention shown in FIG. 1, with lid in an opened position.

A lid 16, constructed of a pliable and resilient material, is provided for closing the top open end of container 12. The lid 16 is hinged to container 12 with a flexible hinge 18 having one end connected to the lid 16, and the other end connected to container 12. Further, a tab 20 is provided on lid 16 for easily lifting lid 16 up and away from container 12. Further, the lid 16 is provided with slits 22 which, in a preferred embodiment, are comprised of two slits perpendicular to one another. A securing ring 24 is attached to the bottom surface of container 12 as shown in FIGS. 1 and 3. A clip body 26 is held by ring 24 as shown in FIG. 3. A resilient member 28 is connected to clip body 26. Member 28 can be depressed against the clip body 26 as shown in FIG. 3 to provide an opening between the resilient member 28 and clip body 26. With this clip, the present invention 10 can be clipped onto a fly fisherman's vest at an appropriate spot. It is contemplated that other clips could be used. For example, instead of using the clip body 26, the ring 24 could be constructed of resilient material. A slit could be cut through the ring 24 which allows the larger portion of ring 24 to twist sideways. By twisting the larger portion of ring 24, the ring 24 can be passed through the loop on a fisherman's vest and then the resiliency of ring 24 returns the ring 24 to a closed position whereby the invention 10 can be easily secured to a loop on a fisherman's vest.

In operation, a fisherman uses container 12 as a receptacle to hold unwanted small objects. The present invention 10 can be clipped to a fisherman's vest using clip body 26. When a fisherman wants to discard small objects such as shot, flies, small wads of paper, but without cluttering a lake or stream, he just pushes the unwanted object through slits 22 into container 12. Further, if the fisherman wants to discard old fishing line, he/she can just wrap the line around cover 14 on container 12. The cover 14 being constructed of Velcro or foam will hold the line or leader wrapped around the covering 14. Further, cover 14 can be used for holding dropper fly rigs. When fishing more than one fly at a time, it can become quite time consuming to tie and re-tie dropper rigs. With the present invention, a fly and tippet together can be wrapped around cover 14 and is ready to rig up again in a very short time.

When it is desired to remove the contents of container 12, the tab 20 is used to lift lid 16 from container 12 of around hinge 18. The contents of container 12 can then be dumped where desired. The lid 16 can then be closed again, and the device is ready for further use.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims.

I claim:

1. A receptacle for attachment to an exposed ring provided on a fisherman's vest comprising:

an elongate container body having a closed bottom wall and an open top;

a container lid sized to frictionally engage and close the open top;

the container lid having at least one slit therethrough;

the container lid constructed of a pliable and resilient material; and a clip means secured to and depending from the closed bottom wall for releasably clipping the receptacle to the exposed ring of the fisherman's vest.

2. The receptacle according to claim 1 wherein the container lid has at least a pair of slits arranged perpendicular to one another.

3. The receptacle of claim 1 whereby the clip means includes a resilient member for opening and closing the clip means.

4. The receptacle according to claim 1 wherein the lid is hingedly connected to the container body.

5. The receptacle according to claim 1 wherein the elongate container body has a longitudinal axis and further has a cross-section perpendicular to the longitudinal axis with a circular shape.

6. The receptacle according to claim 5 further including a cover surrounding the container concentric with the longitudinal axis.

7. The receptacle according to claim 6 wherein the cover is constructed of hook material from a hook and loop connecting material.

8. The receptacle according to claim 6 wherein the cover is constructed of a foam material.

* * * * *